(12) United States Patent
Lee

(10) Patent No.: US 10,910,921 B2
(45) Date of Patent: Feb. 2, 2021

(54) DEVICE FOR DETECTING POSITION OF ROTOR, AND MOTOR COMPRISING SAME

(71) Applicant: LG INNOTEK CO., LTD., Seoul (KR)

(72) Inventor: Myoung Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 463 days.

(21) Appl. No.: 16/068,632

(22) PCT Filed: Dec. 6, 2016

(86) PCT No.: PCT/KR2016/014213
§ 371 (c)(1),
(2) Date: Jul. 6, 2018

(87) PCT Pub. No.: WO2017/119616
PCT Pub. Date: Jul. 13, 2017

(65) Prior Publication Data
US 2019/0028000 A1     Jan. 24, 2019

(30) Foreign Application Priority Data

Jan. 7, 2016    (KR) .................. 10-2016-0002182

(51) Int. Cl.
*H02K 11/215*    (2016.01)
*H02P 6/16*    (2016.01)
*G01D 5/244*    (2006.01)

(52) U.S. Cl.
CPC .......... *H02K 11/215* (2016.01); *G01D 5/244* (2013.01); *H02P 6/16* (2013.01); *H02K 2213/03* (2013.01)

(58) Field of Classification Search
CPC .. H02K 11/21; H02K 11/215; H02K 2213/03; H02P 6/16; G01D 5/244
USPC ........................................ 310/68 B
See application file for complete search history.

(56) References Cited

U.S. PATENT DOCUMENTS

| 6,424,061 B1 | 7/2002 | Fukuda et al. | |
| 2001/0015582 A1* | 8/2001 | Nakajima | H02K 29/08 310/68 B |
| 2008/0211357 A1 | 9/2008 | Kataoka et al. | |
| 2009/0302793 A1 | 12/2009 | Kawamura et al. | |

FOREIGN PATENT DOCUMENTS

| JP | 2001-86724 A | 3/2001 |
| JP | 2007-252096 A | 9/2007 |
| JP | 2010-200543 A | 9/2010 |
| JP | 2011-182569 A | 9/2011 |
| KR | 10-2014-0078795 A | 6/2014 |

* cited by examiner

*Primary Examiner* — Alex Torres-Rivera
*Assistant Examiner* — David A. Singh
(74) *Attorney, Agent, or Firm* — Birch, Stewart, Kolasch & Birch, LLP

(57) ABSTRACT

The present invention provides a rotor position detection device including a sensor having a first chip and a second chip which are aligned with a first line and detect a change in magnetic flux in a sensing magnet, wherein the sensor has the first line which is inclined with respect to a second line passing through any one of the first chip and the second chip in a radial direction of the sensing magnet. Accordingly, the present invention provides an advantageous effect of detecting a rotational direction and a precise rotational angle of the motor by utilizing one sensor.

8 Claims, 9 Drawing Sheets

[FIG. 1]
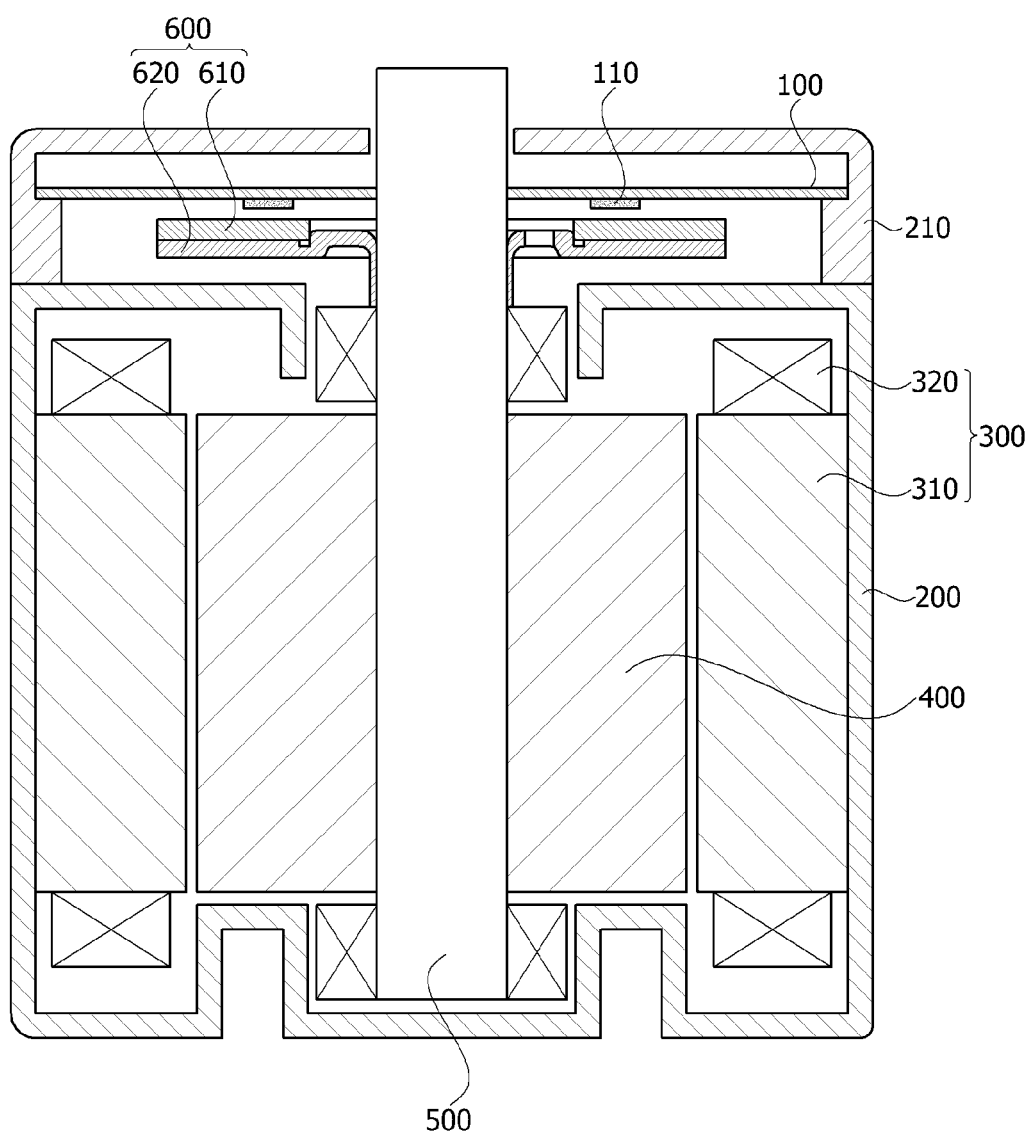

[FIG. 2]
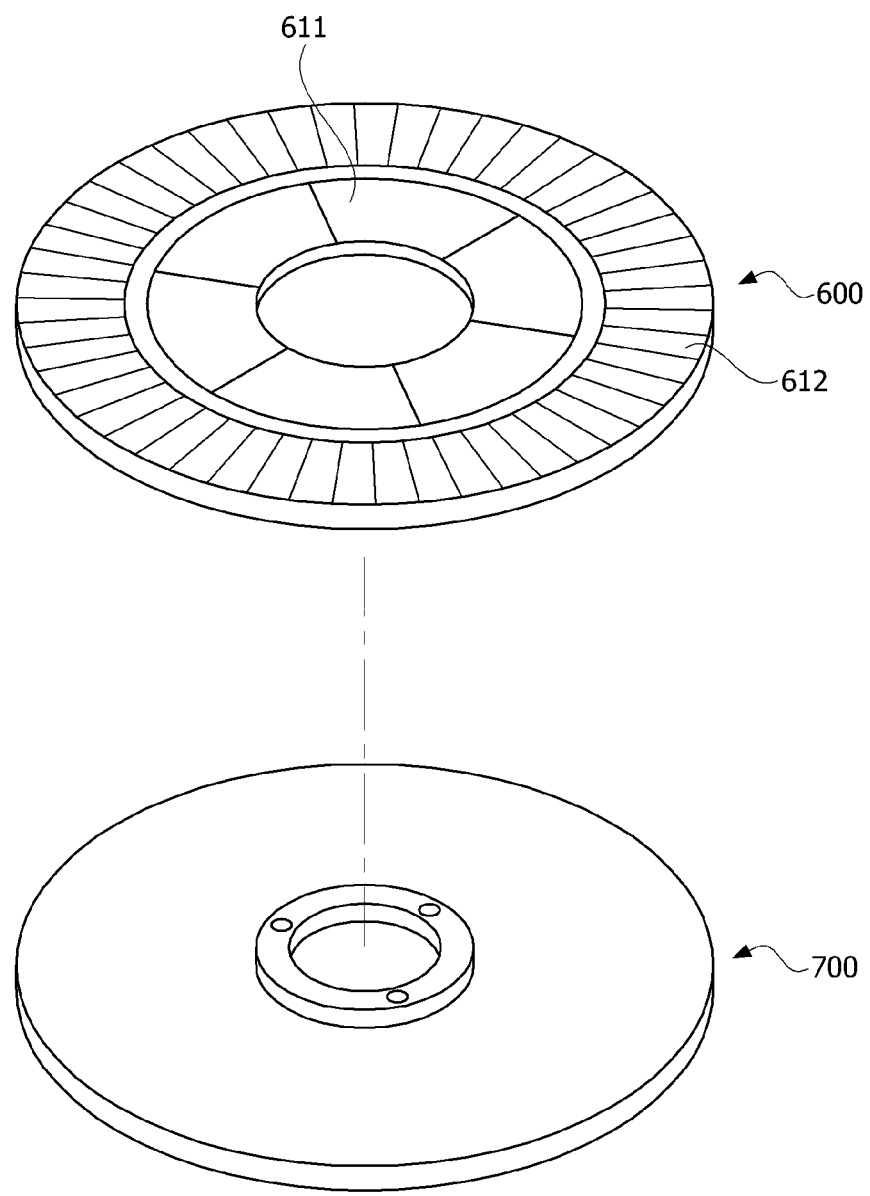

[FIG. 3]
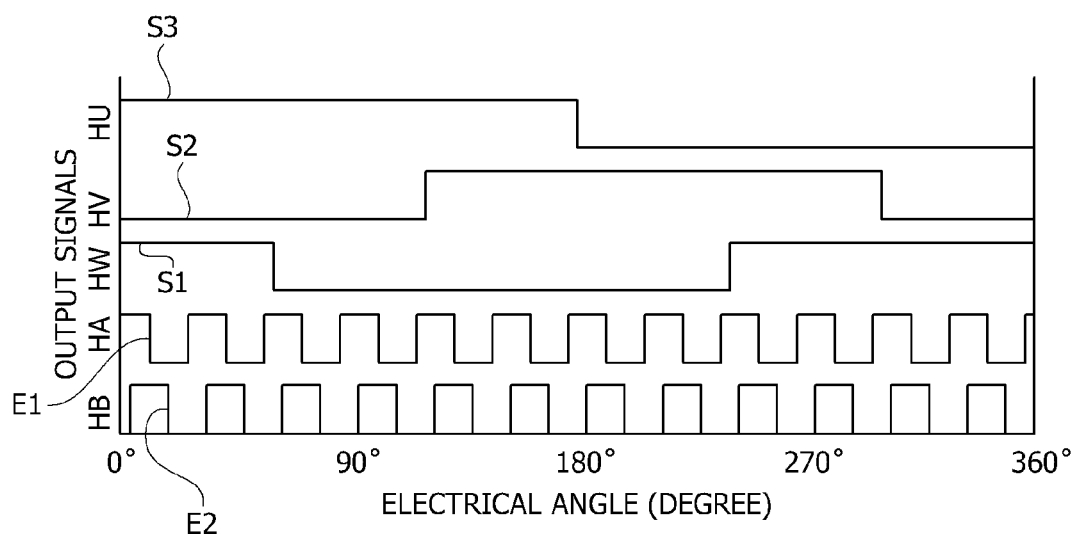

[FIG. 4]
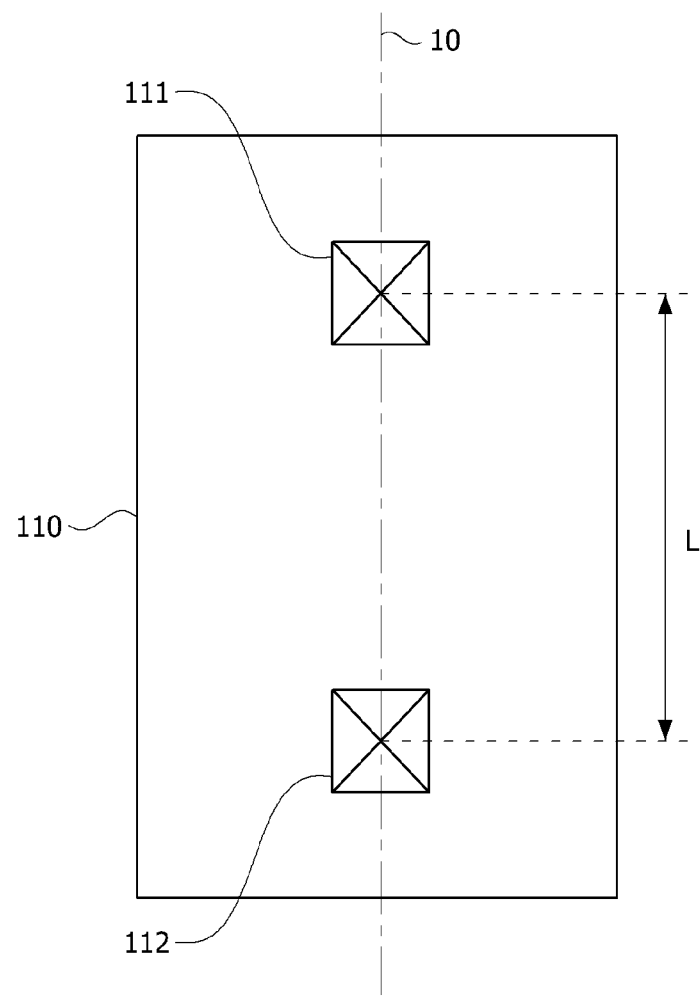

[FIG. 5]
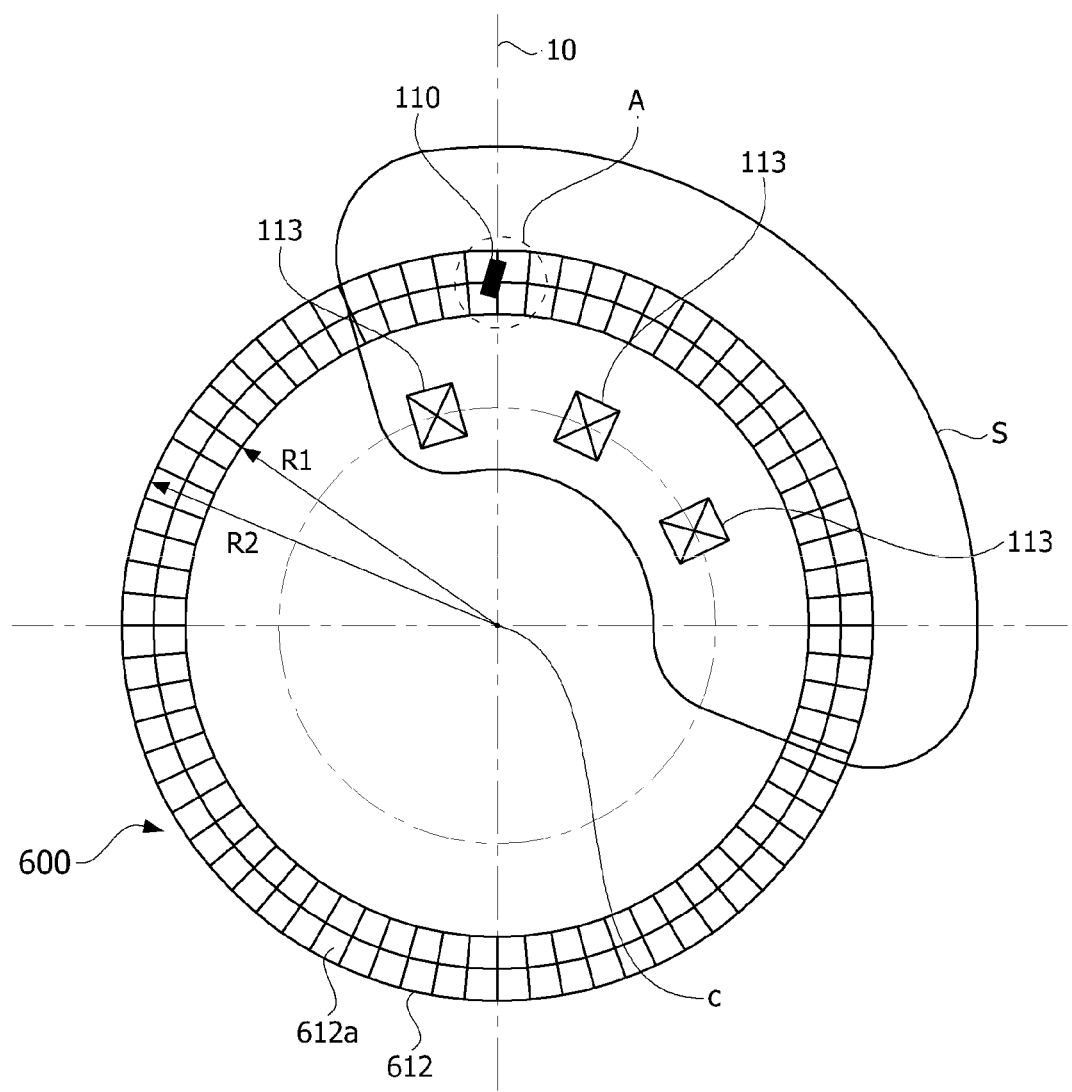

[FIG. 6]
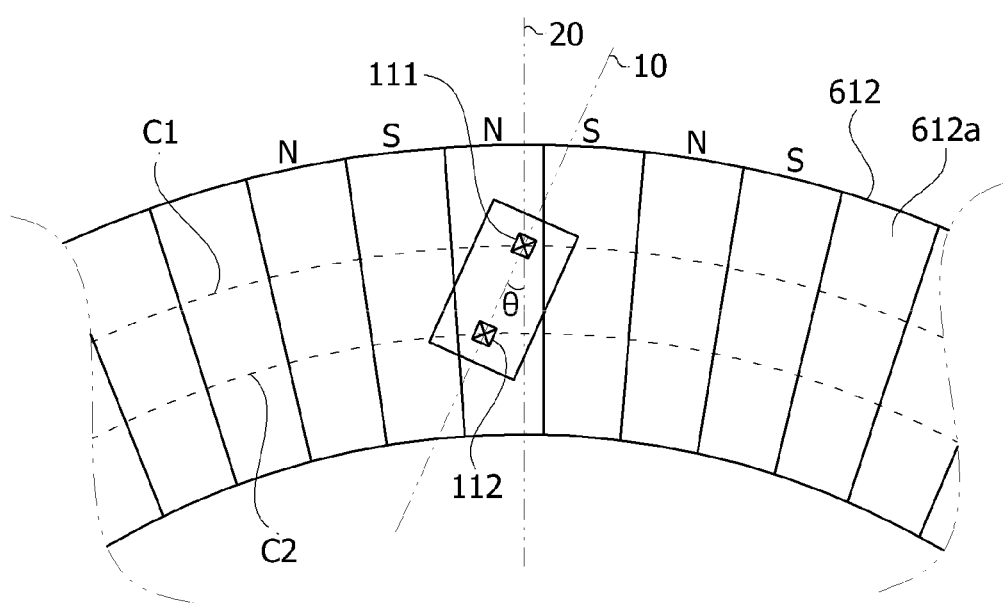

[FIG. 7]
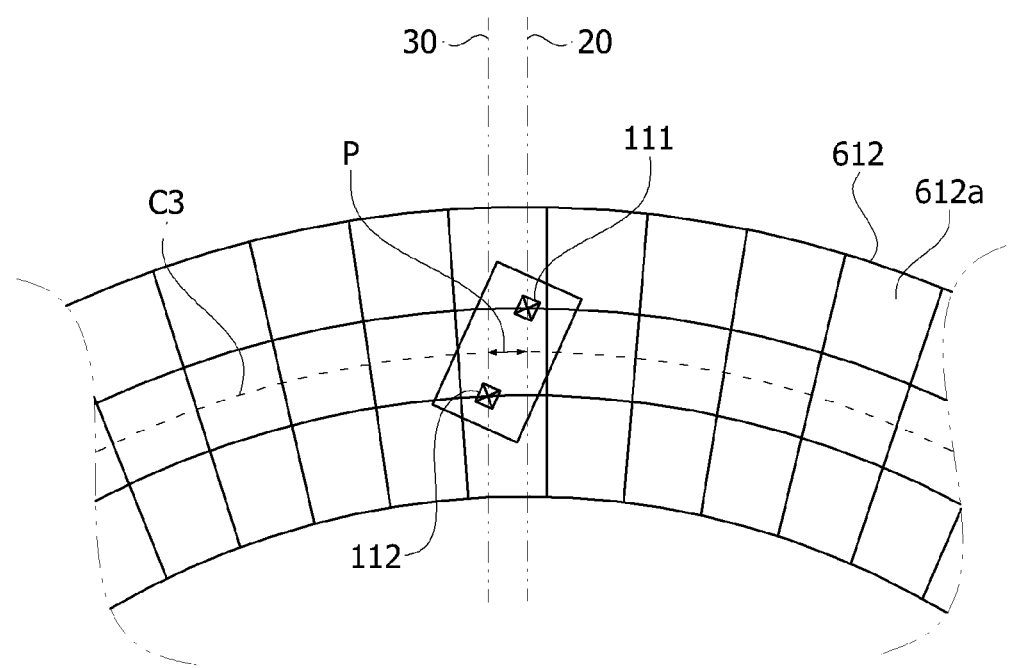

[FIG. 8]
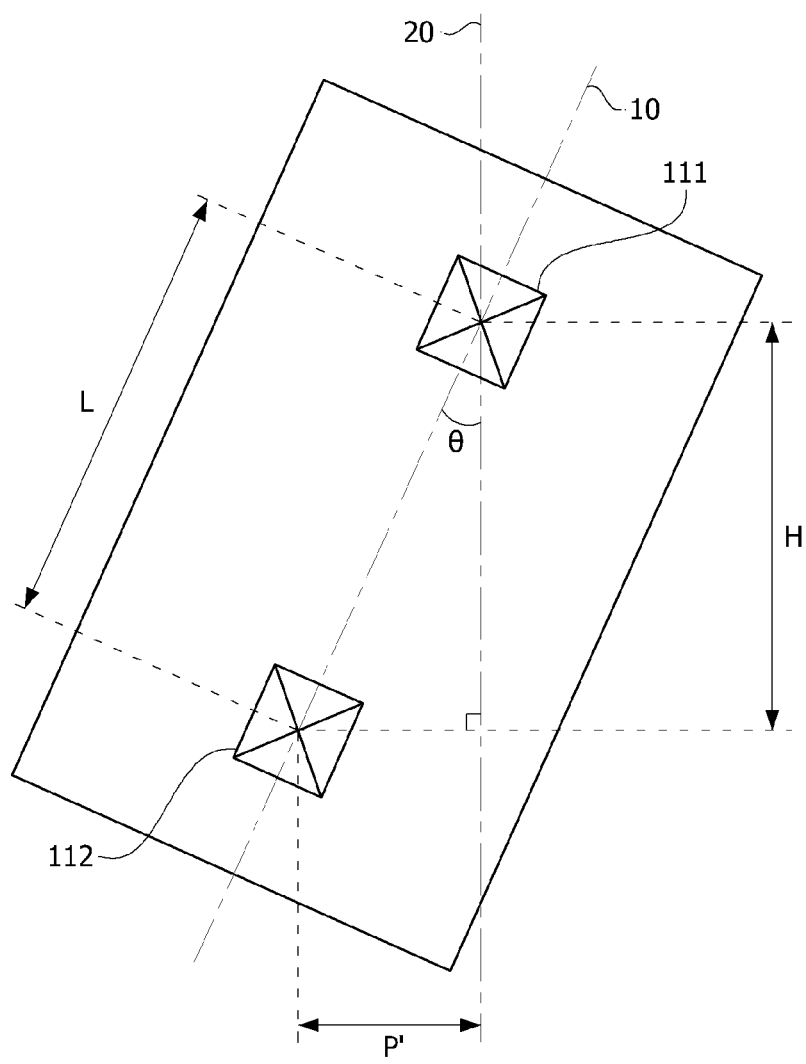

[FIG. 9]
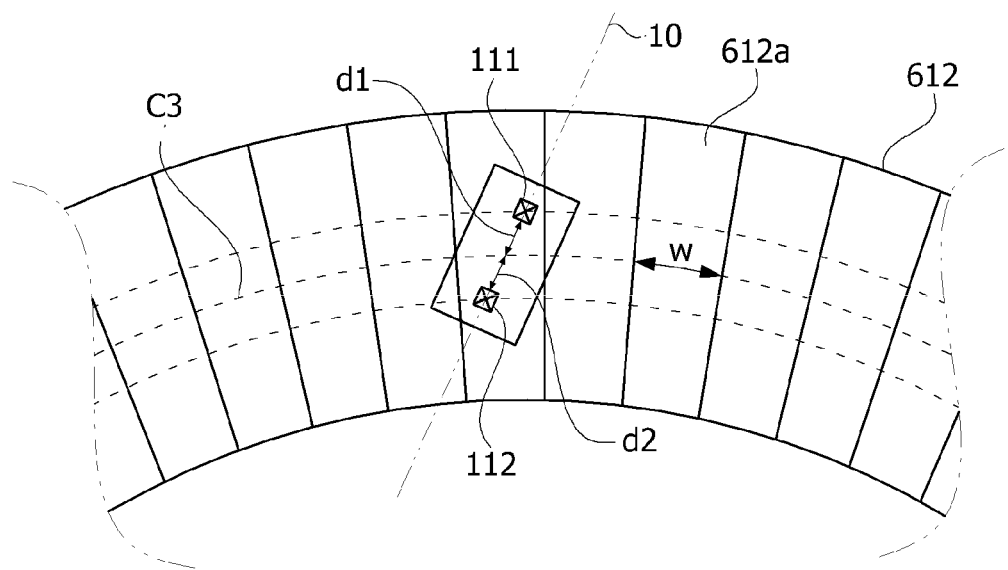

DEVICE FOR DETECTING POSITION OF ROTOR, AND MOTOR COMPRISING SAME

CROSS REFERENCE TO RELATED APPLICATIONS

This application is the National Phase of PCT International Application No. PCT/KR2016/014213, filed on Dec. 6, 2016, which claims priority under 35 U.S.C. 119(a) to Patent Application No. 10-2016-0002182, filed in the Republic of Korea on Jan. 7, 2016, all of which are hereby expressly incorporated by reference into the present application.

TECHNICAL FIELD

The present invention relates to a device for detecting a position of a rotor, and a motor including the same.

BACKGROUND ART

Generally, a rotor is rotated due to an electromagnetic interaction between the rotor and a stator in a motor. Here, since a rotating shaft inserted into the rotor is also rotated, a rotational driving force is generated.

A sensor including a magnetic element is disposed inside the motor as a rotor position detecting device. The sensor determines a present position of the rotor by detecting a magnetic force of the sensing magnet installed to be rotatable in conjunction with the rotor.

The sensor may include a plurality of magnetic elements. Here, in addition to three magnetic elements for feedback on U-phase, V-phase, and W-phase information, two magnetic elements for determination of a rotation direction and a more precise rotation angle of the motor are additionally installed in the sensor. The two magnetic elements are disposed to be spaced a predetermined distance (hereinafter, referred to as a pitch) from each other in a circumferential direction of the sensing magnet. Accordingly, sensing signals detected by the two magnetic elements have a phase difference, and thus the rotation direction and the rotation angle of the motor are more precisely determined.

However, there is a problem in that manufacturing cost increases because two magnetic elements are used to detect the rotational direction of the motor.

DISCLOSURE

Technical Problem

The present invention is directed to providing a rotor position detection device capable of detecting a rotational direction of a motor using one magnetic element, and a motor including the same.

Objectives to be achieved by embodiments of the present invention are not limited to the above-described objectives, and other objectives, which are not described above, may be clearly understood by those skilled in the art through the following specification.

Technical Solution

One aspect of the present invention provides a rotor position detection device including a sensor having a first chip and a second chip which are aligned with a first line and detect a change in magnetic flux in a sensing magnet, wherein the sensor has the first line which is inclined with respect to a second line passing through any one of the first chip and the second chip in a radial direction of the sensing magnet.

The first chip and the second chip may be disposed to face any one of a plurality of split magnets included in the sensing magnet.

A distance between the first chip and the second chip in a circumferential direction of the sensing magnet may be smaller than a width of the split magnet in the circumferential direction of the sensing magnet.

The width of the split magnet may be set with respect to a center of the split magnet in the radial direction of the sensing magnet.

The first chip and the second chip may be spaced the same distance from a center line of the split magnet in the radial direction of the sensing magnet.

A distance between the first chip and the second chip may correspond to a hypotenuse in a trigonometric ratio, an inclination angle between the first line and the second line may correspond to an acute angle in the trigonometric ratio, and a distance between the first chip and the second chip in the circumferential direction of the sensing magnet may correspond to a height in the trigonometric ratio.

Another aspect of the present invention provides a motor including a rotating shaft, a rotor including a hole in which the rotating shaft is disposed, a stator disposed outside the rotor, and a rotor position detection device disposed above the rotor, wherein the rotor position detection device includes a sensing magnet having a plurality of split magnets, a sensor configured to detect a change in magnetic flux in the sensing magnet, the sensor includes a first chip and a second chip which are aligned with a first line and configured to detect the change in magnetic flux in the sensing magnet, and the sensor has the first line which is inclined with respect to a second line formed in a radial direction of the sensing magnet.

In the motor, the first chip and the second chip may face any one of the plurality of split magnets.

In the motor, a distance between the first chip and the second chip in a circumferential direction of the sensing magnet may be smaller than a width of the split magnet in the circumferential direction of the sensing magnet.

In the motor, the width of the split magnet may be set with respect to a center of the split magnet in the radial direction of the sensing magnet.

In the motor, the first chip and the second chip may be spaced the same distance from a center line of the split magnet in the radial direction of the sensing magnet.

In the motor, the sensing magnet may include a main magnet disposed on a first track and a sub-magnet disposed on a second track, wherein the number of split magnets of the main magnet may correspond to the number of poles of the rotor, and the number of split magnets of the sub-magnet may be larger than the number of the split magnets of the main magnet.

In the motor, the first chip and the second chip may be disposed to face any one of the split magnets of the sub-magnet.

A distance between the first chip and the second chip may correspond to a hypotenuse in a trigonometric ratio, an inclination angle between the first line and the second line may correspond to an acute angle in the trigonometric ratio, and a distance between the first chip and the second chip in the circumferential direction of the sensing magnet may correspond to a height in the trigonometric ratio.

Advantageous Effects

According to one embodiment of the present invention, since a rotational direction of the motor is detected using one magnetic element, there is an advantageous effect in reducing manufacturing cost.

DESCRIPTION OF DRAWINGS

FIG. 1 is a conceptual view illustrating a motor according to one embodiment of the present invention.

FIG. 2 is a view illustrating a sensing magnet.

FIG. 3 is a view illustrating a sensing signal.

FIG. 4 is a view illustrating a sensor including first and second chips.

FIG. 5 is a view illustrating the sensing magnet and the sensor.

FIG. 6 is a view illustrating the sensor which is obliquely disposed.

FIG. 7 is a view illustrating a pitch between the first and second chips.

FIG. 8 is a view illustrating the pitch according to an inclination angle of the sensor.

FIG. 9 is a view illustrating positions of the first and second chips.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

FIG. 1 is a conceptual view illustrating a motor according to one embodiment of the present invention. Referring to FIG. 1, the motor according to one embodiment of the present invention may include a rotor position detection device 100, a housing 200, a stator 300 disposed inside the housing 200, a rotor 400 rotatably installed in the stator 300, a rotating shaft 500 which passes through, is installed into, and is rotated in conjunction with the rotor 400, and a sensing magnet 600.

The housing 200 is formed in a cylindrical shape and provided with a space in which the stator 300 and the rotor 400 are installed. Here, a shape or a material of the housing 200 may be variously changed, and a metal material which can withstand high temperatures well may be used as a material of the housing 200.

The housing 200 is coupled to a cover 210 to shield the stator 300 and the rotor 400 from the outside. In addition, the housing 200 may further include a cooling structure (not shown) to easily dissipate internal heat. The cooling structure may include an air- or water-cooling structure, and the shape of the housing 200 may be suitably changed according to the cooling structure.

The stator 300 is inserted into an internal space of the housing 200. The stator 300 may include a stator core 310 and a coil 320 wound around the stator core 310. The stator core 310 may be an integrated core formed in a ring shape or a core in which a plurality of split cores are coupled.

The stator 300 may be suitably changed according to a type of the motor. For example, the stator 300 may be manufactured such that, in the case of a direct current (DC) motor, a coil may be wound around an integrated stator core, and in the case of a three-phase control motor, U-phase, V-phase, and W-phase are input to a plurality of coils.

The rotor 400 may be rotatably disposed in the stator 300. A magnet is installed at the rotor 400, and the rotor 400 electromagnetically interacts with the stator 300 to rotate.

The rotating shaft 500 is coupled to a central portion of the rotor 400. Accordingly, when the rotor 400 rotates, the rotating shaft 500 also rotates. Here, the rotating shaft 500 may be rotatably supported by a bearing.

The rotating shaft 500 is coupled to an external apparatus to provide power to the external apparatus. As an example, in the case of an electric power steering (EPS) motor, the rotating shaft 500 may be connected to a vehicle steering shaft to provide assistant steering power to the vehicle steering shaft.

The rotor position detection device 100 detects a change in magnetic flux in the sensing magnet 600 rotated in conjunction with the rotating shaft 500 to detect a rotational position of the rotor 400. A sensor 110 disposed on a substrate is disposed to be spaced apart from the sensing magnet 600 and may calculate a rotational angle according to the change in magnetic flux. The sensor 110 may be a Hall integrated circuit (IC).

FIG. 2 is a view illustrating a sensing magnet.

Referring to FIG. 2, the sensing magnet 600 may be seated on a sensing plate 700. The sensing plate 700 is coupled to the rotating shaft 500.

The sensing magnet 600 may be formed in a circular disk shape and may include a main magnet 611 disposed at a central portion of the sensing magnet 600 and a sub-magnet 612 disposed at an edge of the sensing magnet 600. The main magnet 611 includes a plurality of split magnets formed in a split ring shape. The number of the split magnets (poles) of the main magnet 611 is the same as the number of rotor magnets (poles) so that rotation of the rotor may be detected.

The sub-magnet 612 is disposed at the edge of the circular disk and includes split magnets (poles) of which the number is greater than that of the split magnets of the main magnet 611. Accordingly, the pole of the sub-magnet 612 is matched with a subdivision of one pole (split magnet) of the main magnet 611. Accordingly, an amount of rotation may be more precisely measured.

The rotor position detection device 100 may include a plurality of sensors configured to detect a change in magnetic flux according to rotation of the sensing magnet 600 in order to detect a position of the rotor 400.

A position of the main magnet 611 of the sensing magnet 600 corresponds to a position of a magnet of the rotor 400. A change in magnetic flux of the main magnet 611 has to be detected to detect a position of the rotor 400.

FIG. 3 is a view illustrating a sensing signal.

Referring to FIG. 3, the rotor position detection device 100 may detect a change in magnetic flux of the main magnet 611 to detect three sensing signals S1, S2, and S3. In addition, the rotor position detection device 100 may detect a change in magnetic flux in the sub-magnet 612 to detect two sensing signals E1 and E2. Here, a rotational direction and a precise rotational angle of the motor may be calculated using the two sensing signals E1 and E2.

FIG. 4 is a view illustrating a sensor including first and second chips.

Referring to FIG. 4, two chips are used in the sensor 110 according to the embodiment.

The sensor 110 includes a first chip 111 and a second chip 112 in one body thereof. In addition, the first chip 111 and the second chip 112 may be disposed to be aligned with a first line 10. Here, the first chip 111 and the second chip 112 may be disposed to be spaced apart by a distance L of FIG. 4.

FIG. 5 is a view illustrating the sensing magnet and the sensor.

Referring to FIG. 5, the sensor 110 is disposed to face the sub-magnet 612. The rotor position detection device 100 may also include sensors 113 configured to detect a change in magnetic flux in the main magnet 611 of FIG. 2. The sensors 110 and 113 are mounted on a substrate S to face the sensing magnet 600.

For example, the sensing magnet 600 may include the sub-magnet 612 having seventy-two split magnets 612a, and in the case of a six-pole motor, the sensing magnet 600 may include the main magnet 611 having six split magnets as illustrated in FIG. 2.

A difference in outer diameter R2 and inner diameter R1 of the sub-magnet 612 with respect to a center C of the sensing magnet 600 is referred to as a length of the sub-magnet 612.

FIG. 6 is a view illustrating the sensor which is obliquely disposed.

Referring to FIG. 6, the sensor 110 may be disposed such that the first line 10 is inclined with respect to a second line 20. Here, the first line 10 is a reference line with which the first chip 111 and the second chip 112 are aligned, and the second line 20 is a reference line which passes through the first chip 111 in a radial direction with respect to the center C of the sensing magnet 600 of FIG. 5.

An angle formed by the first line 10 and the second line 20 corresponds to an inclination angle θ of FIG. 6. The first chip 111 and the second chip 112 may be aligned on one split magnet 612a. In the sub-magnet 612, since N-pole split magnets 612a and S-pole split magnets 612a are alternately disposed in a circumferential direction, and the first line 10 is inclined with respect to the second line 20, the first chip 111 and the second chip 112 may be aligned on one split magnet.

FIG. 7 is a view illustrating a pitch between the first chip and the second chip.

Two sensing signals having different phases have to be obtained through the sub-magnet 612 in order to control a rotational direction and a precise rotational angle of the motor. Accordingly, two sensors have to be disposed to be spaced apart from each other in the circumferential direction of the sensing magnet 600, and the two sensors have to be aligned on the split magnet having the same pole (N-pole or S-pole).

Here, a distance between two sensors in the circumferential direction is referred to as a pitch P. In the case of the sub-magnet 612, since a width of the split magnet 612a is small due to many split magnets 612a, the pitch is secured using the two sensors, but in the embodiment, the pitch P may be secured using a space formed in the circumferential direction between the first chip 111 and the second chip 112 included in one sensor as illustrated in FIG. 7.

When a reference line in the circumference direction, which passes through centers of lengths of the sub-magnets 612 in the radial direction of the sensing magnet 600, is referred to as a reference line C3 of FIG. 7, and a reference line, which passes through the center C of the sensing magnet 600 and the second chip 112, is referred to as a reference line 30 of FIG. 7, the pitch P between the second line 20 and the reference line 30 may be secured on the reference line C3 of FIG. 7.

FIG. 8 is a view illustrating the pitch according to an inclination angle of the sensor.

Referring to FIG. 8, the inclination angle θ and a height H to align the first chip 111 and the second chip 112 on one split magnet may be set such that a calculated pitch P' is a target pitch P. Here, the pitch P' may different from the pitch P of FIG. 7 in the radial direction of the sensing magnet 600, but it may be estimated that the pitch P' is the same as the pitch P because a difference between the pitch P' and the pitch P is small.

That is, the distance L between the first chip 111 and the second chip 112 is a fixed value, and the inclination angle θ may be changed such that the pitch P corresponds to a target pitch. Here, the height H of FIG. 8 may be limited to a width of the sensing magnet 600. Here, the inclination angle θ corresponds to an acute angle in a trigonometric ratio, and the distance L corresponds to a length of a hypotenuse in the trigonometric ratio, and the pitch P' corresponds to a height in the trigonometric ratio.

FIG. 9 is a view illustrating positions of the first and second chips.

Referring to FIG. 9, a distance d1 from an intersecting point of the first line 10 and the reference line C3 of FIG. 3 to the first chip 111 may be the same as a distance d2 from an intersecting point of the first line 10 and the reference line C3 of FIG. 3 to the second chip 112.

Since a width w of FIG. 9 corresponds to a width w of the split magnet 612a included in the sub-magnet 612 and the pitch P between the first chip 111 and the second chip 112 is smaller than the width w of the split magnet 612a, the first chip 111 and the second chip 112 may be aligned on one split magnet. Such a configuration may generate two sensing signals having different phases using one sensor including the two chips without using two sensors.

Here, the width w of split magnet 612a may be set based on the reference line C3 of FIG. 7 passing through the centers of the split magnets in the radial direction of the sensing magnet 600.

As described above, a rotor position detection device and a motor according to one exemplary embodiment of the present has been specifically described with reference to the accompanying drawings.

The above description is only an example describing a technological scope of the present invention. Various changes, modifications, and replacements may be made without departing from the spirit and scope of the present invention by those skilled in the art. Therefore, the embodiments disclosed above and in the accompanying drawings should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

REFERENCE NUMERALS

100: ROTOR POSITION DETECTION DEVICE
110: SENSOR PART
111: FIRST CHIP
112: SECOND CHIP
113: THIRD CHIP
120: CONTROL PART
200: HOUSING
300: STATOR
400: ROTOR
500: ROTATING SHAFT
600: SENSING MAGNET
611: MAIN MAGNET
612: SUB-MAGNET
612A: SPLIT MAGNET
700: SENSING PLATE

The invention claimed is:

1. A rotor position detection device comprising a sensor including a first chip and a second chip which are aligned with a first line and detect a change in magnetic flux in a sensing magnet,
wherein the sensor has the first line which is inclined with respect to a second line passing through any one of the first chip and the second chip in a radial direction of the sensing magnet,
wherein the sensing magnet include a main magnet and a sub-magnet disposed outside of the main magnet,
wherein N-pole split magnets and S-pole split magnets in the sub-magnet are alternately disposed in a circumferential direction,
wherein a distance between the first chip and the second chip in a circumferential direction of the sensing magnet is smaller than a width of the split magnet in the circumferential direction of the sensing magnet,
wherein the width of the split magnet is set with respect to a center of the sub magnet in the radial direction of the sensing magnet,
wherein the first chip and the second chip are aligned on one split magnet, and
wherein the sensor includes a first chip and a second chip in one body thereof.

2. The rotor position detection device of claim 1, wherein the sub-magnet has seventy-two split magnets, and the main magnet has six split magnets.

3. The rotor position detection device of claim 1, wherein the first chip and the second chip are spaced the same distance from a center line of the split magnet in the radial direction of the sensing magnet.

4. The rotor position detection device of claim 1, wherein:
a distance between the first chip and the second chip corresponds to a hypotenuse in a trigonometric ratio;
an inclination angle between the first line and the second line corresponds to an acute angle in the trigonometric ratio; and
a distance between the first chip and the second chip in the circumferential direction of the sensing magnet corresponds to a height in the trigonometric ratio.

5. A motor comprising:
a rotating shaft;
a rotor including a hole in which the rotating shaft is disposed;
a stator disposed outside the rotor; and
a rotor position detection device disposed above the rotor,
wherein the rotor position detection device includes a sensing magnet having a plurality of split magnets and a sensor configured to detect a change in magnetic flux in the sensing magnet,
wherein the sensor includes a first chip and a second chip which are aligned with a first line and configured to detect the change in magnetic flux in the sensing magnet, and the sensor has the first line which is inclined with respect to a second line formed in a radial direction of the sensing magnet,
wherein the sensing magnet include a main magnet and a sub-magnet disposed outside of the main magnet,
wherein N-pole split magnets and S-pole split magnets in the sub-magnet are alternately disposed in a circumferential direction,
wherein a distance between the first chip and the second chip in a circumferential direction of the sensing magnet is smaller than a width of the split magnet in the circumferential direction of the sensing magnet,
wherein the width of the split magnet is set with respect to a center of the sub magnet in the radial direction of the sensing magnet,
wherein the first chip and the second chip are aligned on one split magnet, and
wherein the sensor includes a first chip and a second chip in one body thereof.

6. The motor of claim 5, wherein the sub-magnet has seventy-two split magnets, and the main magnet has six split magnets.

7. The motor of claim 5, wherein the first chip and the second chip are spaced the same distance from a center line of the split magnet in the radial direction of the sensing magnet.

8. The motor of claim 5, wherein:
a distance between the first chip and the second chip corresponds to a hypotenuse in a trigonometric ratio;
an inclination angle between the first line and the second line corresponds to an acute angle in the trigonometric ratio; and
a distance between the first chip and the second chip in the circumferential direction of the sensing magnet corresponds to a height in the trigonometric ratio.

* * * * *